US005550723A

United States Patent [19]
Ullman

[11] Patent Number: 5,550,723
[45] Date of Patent: Aug. 27, 1996

[54] APPARATUS AND METHOD FOR RETROFITTING INCANDESCENT LIGHTING FIXTURES

[76] Inventor: Allan Ullman, Lattingtown Rd., Glen Cove, N.Y. 11542

[21] Appl. No.: 290,397

[22] Filed: Aug. 15, 1994

[51] Int. Cl.$^6$ .................................................. F21V 23/00
[52] U.S. Cl. .......................... 362/260; 362/216; 362/247; 362/364
[58] Field of Search .................................... 362/216, 225, 362/247, 260, 364, 365

[56] References Cited

U.S. PATENT DOCUMENTS

| | | |
|---|---|---|
| 4,039,822 | 8/1977 | Chan et al. . |
| 4,313,154 | 1/1982 | Capostagno et al. .................... 362/365 |
| 4,327,403 | 4/1982 | Capostagno et al. .................... 362/306 |
| 4,713,019 | 12/1987 | Gaynor .................................... 439/232 |

*Primary Examiner*—Stephen F. Husar
*Attorney, Agent, or Firm*—Dilworth & Barrese

[57] ABSTRACT

A method and apparatus is disclosed for retrofitting a plurality of adjacent incandescent lighting fixtures for fluorescent service. The method involves the removal of existing incandescent lighting units from first and second adjacent existing lighting fixtures, the mounting of a ballast assembly on the first existing fixture, and the installation of a first fluorescent lighting unit, powered by the ballast assembly, in the first fixture. The method further involves the mounting of a second fluorescent lighting unit in the second fixture, with the second unit being powered by the ballast assembly located in the first fixture.

13 Claims, 5 Drawing Sheets

APPARATUS AND METHOD FOR RETROFITTING INCANDESCENT LIGHTING FIXTURES

BACKGROUND OF THE INVENTION

1. Field of the Invention

This invention relates to illuminating fixtures, and more particularly, to an apparatus and method for retrofitting a plurality of existing incandescent lighting fixtures for fluorescent service.

2. Description of the Related Art

For many years, lighting fixtures employing incandescent lamps have been widely utilized. It has become broadly accepted however, that incandescent lighting is inefficient and expensive. Recently, in an effort to reduce the cost of providing illumination, incandescent lighting units have been replaced by fluorescent lighting units. In most instances, an annual cost reduction of as much as 60% can be realized by replacing incandescent lighting units with fluorescent light.

Recessed ceiling lighting fixtures are commonly employed to illuminate such locations as homes, office spaces, and warehouses. Traditionally, such fixtures contained incandescent lighting units as disclosed, for example, in U.S. Pat. No. 4,327,403 to Capostagno et al. and U.S. Pat. No. 4,039,822 to Chan et al. However, to reduce the cost of illumination, and at the same time reduce the cost of replacing the existing lighting fixtures, it has become extremely advantageous to retrofit existing incandescent ceiling lighting fixtures for fluorescent service.

In general, to retrofit an existing incandescent ceiling fixture, the existing incandescent socket is removed and replaced with a new socket configured to receive a fluorescent lamp. An example of such a socket is disclosed in U.S. Pat. No. 4,713,019 to Gaynor. In addition, a ballast is mounted to the existing lighting fixture to power the new fluorescent lamp. The existing reflector housing may also be replaced with a new housing that is particularly adapted for fluorescent illumination.

Although such retrofit procedures have been shown to produce substantial monetary savings, further cost reduction can be realized. In particular, it would be beneficial to provide an apparatus and method for efficiently retrofitting a plurality of existing incandescent ceiling fixtures for fluorescent service utilizing a single ballast assembly. Such a method would reduce the costs associated with parts and labor.

SUMMARY OF THE INVENTION

A method is provided for retrofitting a plurality of adjacent ceiling mounted incandescent lighting fixtures. The method includes the steps of removing an existing incandescent lighting unit from each of a plurality of existing lighting fixtures, mounting a ballast assembly on one of the plurality of adjacent lighting fixtures, and subsequently installing a fluorescent lighting unit, powered by the ballast assembly, in each of the plurality of adjacent lighting fixtures.

In a preferred embodiment of the subject invention, the method includes the steps of removing an existing incandescent lighting unit from first and second adjacent lighting fixtures, mounting a ballast assembly on the first lighting fixture, installing a first fluorescent lighting unit powered by the ballast assembly in the first lighting fixture, and installing a second fluorescent lighting unit, powered by the same ballast assembly, in the second lighting fixture. Thus, a single ballast assembly powers two adjacent lighting fixtures. This arrangement substantially reduces the cost of parts and labor.

The apparatus utilized in the method of the subject invention comprises a ballast assembly from which extends a first cable having a first fluorescent lighting unit associated therewith for installation in a first existing ceiling fixture, and a second cable which is substantially longer that the first cable and which has a second fluorescent lighting unit associated therewith for installation in a second existing ceiling fixture adjacent the first fixture.

These and other features of the subject invention will become more readily apparent from the following derailed description of the invention taken in conjunction with the drawings.

BRIEF DESCRIPTION OF THE DRAWINGS

So that one skilled in the art to which the subject invention appertains will better understand how to make and use the invention, preferred embodiments of the method and apparatus of the invention will be described hereinbelow with reference to the drawings wherein.

DETAILED DESCRIPTION OF THE PREFERRED EMBODIMENTS

Figure 1:
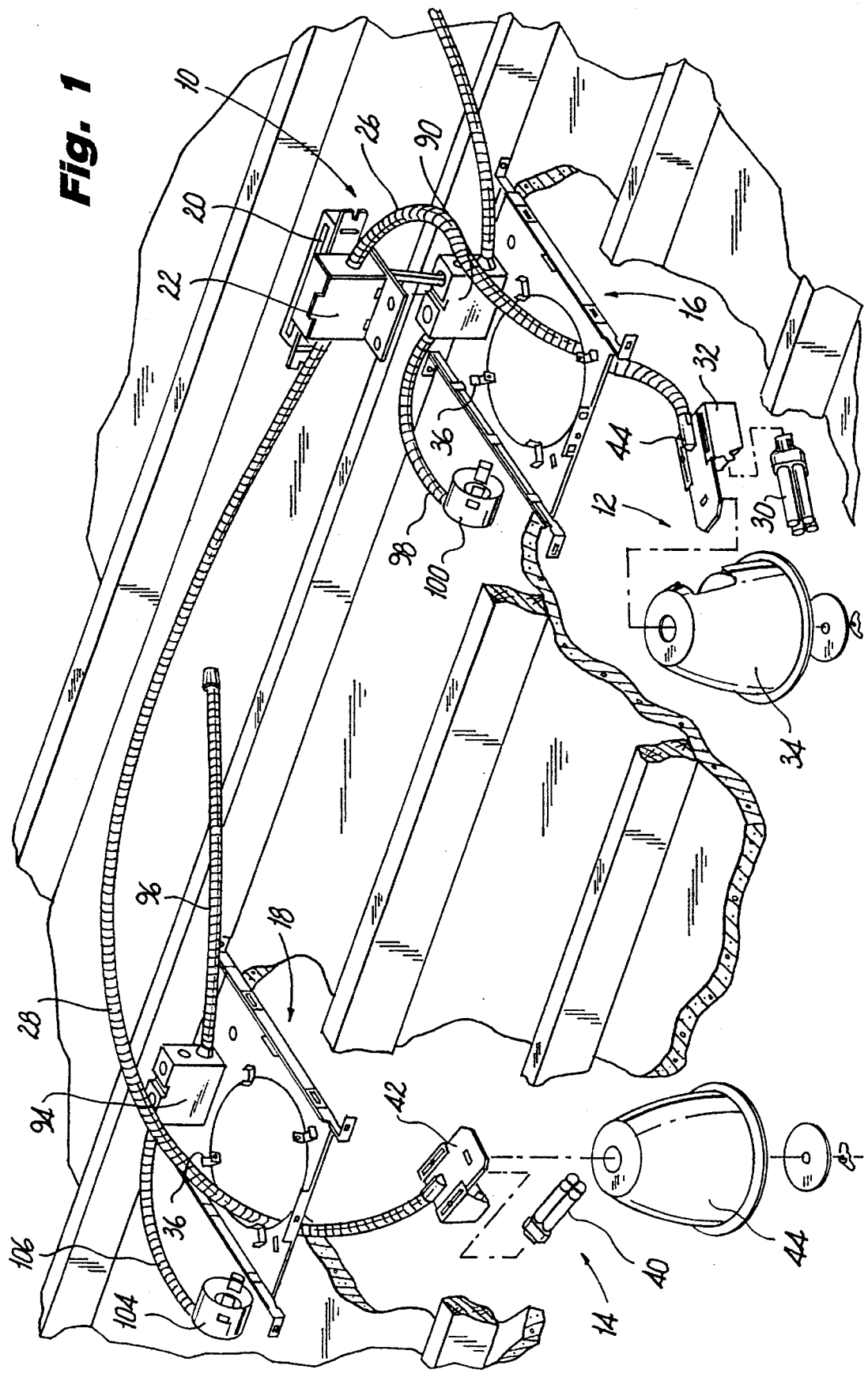
FIG. 1 is a perspective view of a retrofit assembly for ceiling mounted lighting fixtures constructed in accordance with a preferred embodiment of the subject invention with parts separated for ease of illustration.

Referring now to the drawings wherein like reference numerals indicate similar structural elements of the subject invention, there is illustrated in FIG. 1 an assembly for retrofitting ceiling mounted lighting fixtures constructed in accordance with a preferred embodiment of the subject invention and designated generally by reference numeral 10. In brief, assembly 10 is provided to efficiently retrofit two adjacent incandescent lighting fixtures for fluorescent service.

Referring to FIG. 1, retrofit assembly 10 includes first and second fluorescent lighting units 12 and 14 which are configured to be respectively mounted in two existing ceiling mounted incandescent lighting fixtures 16 and 18. The existing lighting fixtures are discussed in greater detail hereinbelow. In accordance with the subject invention, lighting units 12 and 14 are controlled by a single ballast 20.

The type of ballast utilized in retrofit assembly 10 will depend upon the operating conditions of the lighting system and the needs of the user. For example, an electronic dimming ballast can be employed to raise the overall efficiency of the system. Less efficient core-coil ballasts are also available. Ballast 20 is supported on a conventional junction box 22 which is configured to be mounted to one of the existing lighting fixtures discussed below. In such an arrangement, the lighting fixture possessing the ballast mechanism functions as a "dominant" fixture, while the lighting fixture adjacent thereto serves as a "subordinate" fixture.

Figure 2:
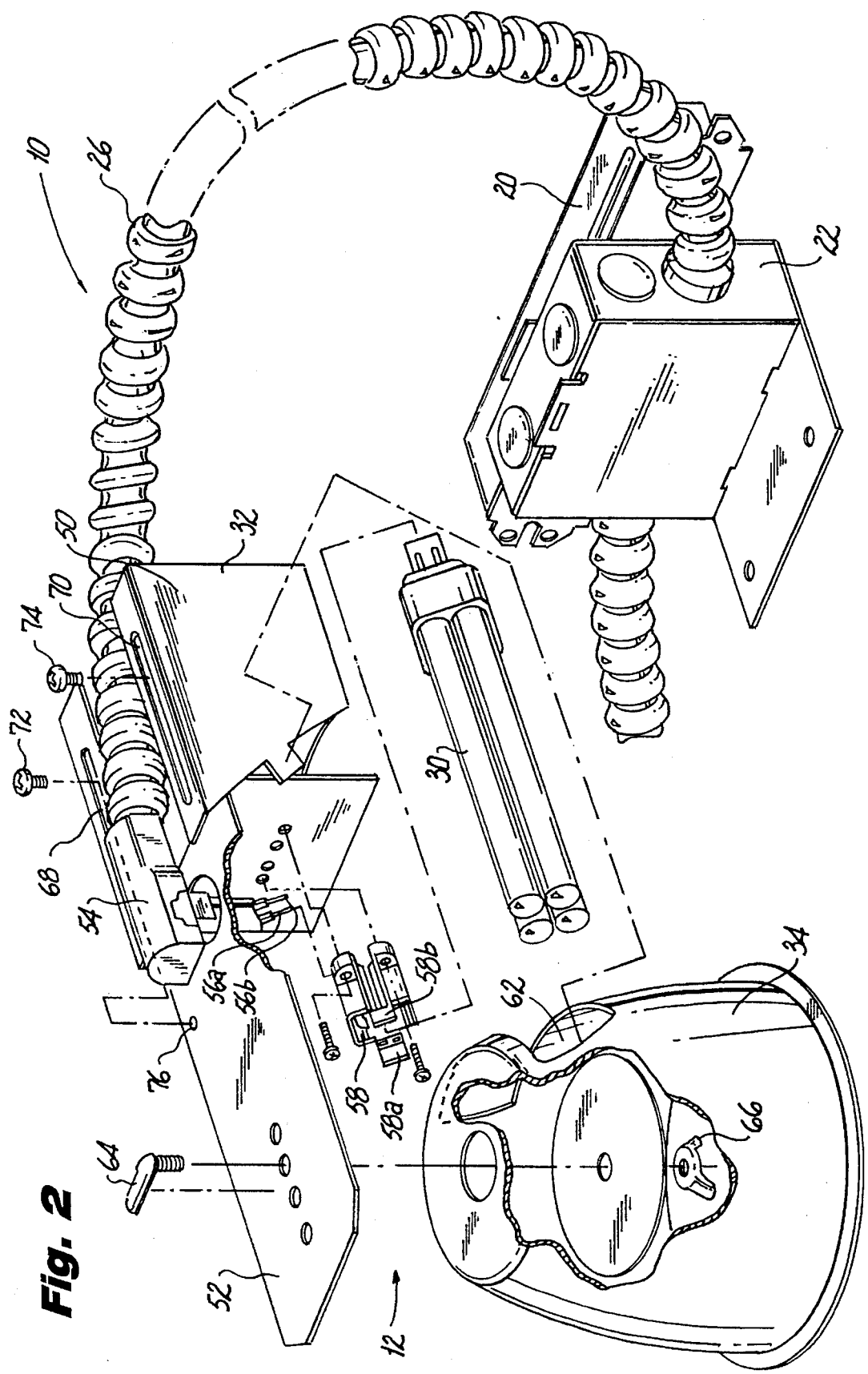
FIG. 2 is an exploded perspective view of a lighting unit of the retrofit assembly illustrated in FIG. 1.

With continued reference to FIG. 1, lighting units 12 and 14 are connected to junction box 22 by respective power cables 26 and 28. Power cable 28 has a greater length than power cable 26 since it spans the distance between lighting fixtures 16 and 18. Lighting unit 12 includes a fluorescent lamp 30, a lamp housing 32 for supporting lamp 30, and a reflector housing 34. Similarly, lighting unit 14 includes a fluorescent lamp 40, a lamp housing 42 for supporting lamp 40, and a reflector housing 44. Reflector housings 34 and 44 support lamp housings 32 and 42 respectively, and are mounted in lighting fixtures 16 and 18 by a plurality of spring biased engagement clips 36. The fluorescent lamps shown in FIGS. 1 and 2 are energy efficient compact fluorescent lamps which are well known in the art. Such lamps use the "rare earth" phosphors for good color rendition and lumen maintenance characteristics.

Turning to FIG. 2, lamp housing 32 includes a generally rectangular mounting flange 50 and an adjustable base portion 52. A fitting 54 is provided on base portion 52 for receiving power cable 26. Connective leads 56a, 56b, 56c, and 56d extend from fitting 54 to socket 58 which is configured to receive fluorescent lamp 30. Socket 58 is a socket which is similar to the type of socket described in U.S. Pat. No. 4,713,019 to Gaynor, the disclosure of which is herein incorporated by reference. In the Gaynor patent, various sockets are described, each provided with keyed receptacles configured to accept a fluorescent lamp of a particular wattage. In contrast, socket 58 is configured to receive fluorescent lamps of different wattage. More particularly, socket 58 includes nonspecific keys 58a and 58b which are positioned to permit universal reception of compact fluorescent lamps of any wattage.

With continued reference to FIG. 2, a port 62 is defined in the wall of reflector housing 34 for receiving lamp housing 32. Threaded fasteners 64 and 66 are provided for connecting reflector housing 34 to the base portion 52 of lamp housing 32 to assemble lighting unit 12. As noted briefly above, base portion 52 is adjustable and can be moved relative to the mounting flange 50 of lamp housing 32 to accommodate reflector housings of various size and shape. To facilitate the adjustability of base portion 52, a pair of opposed longitudinally extending slots 68 and 70 are defined in mounting flange 50 which enables variable positioning of a pair of corresponding set screws 72 and 74. Set screws 72 and 74 are threadably associated with corresponding apertures formed in base portion 52, such as, for example, aperture 76. Lighting unit 14 is constructed in substantially the same manner as lighting unit 12.

Figure 3:
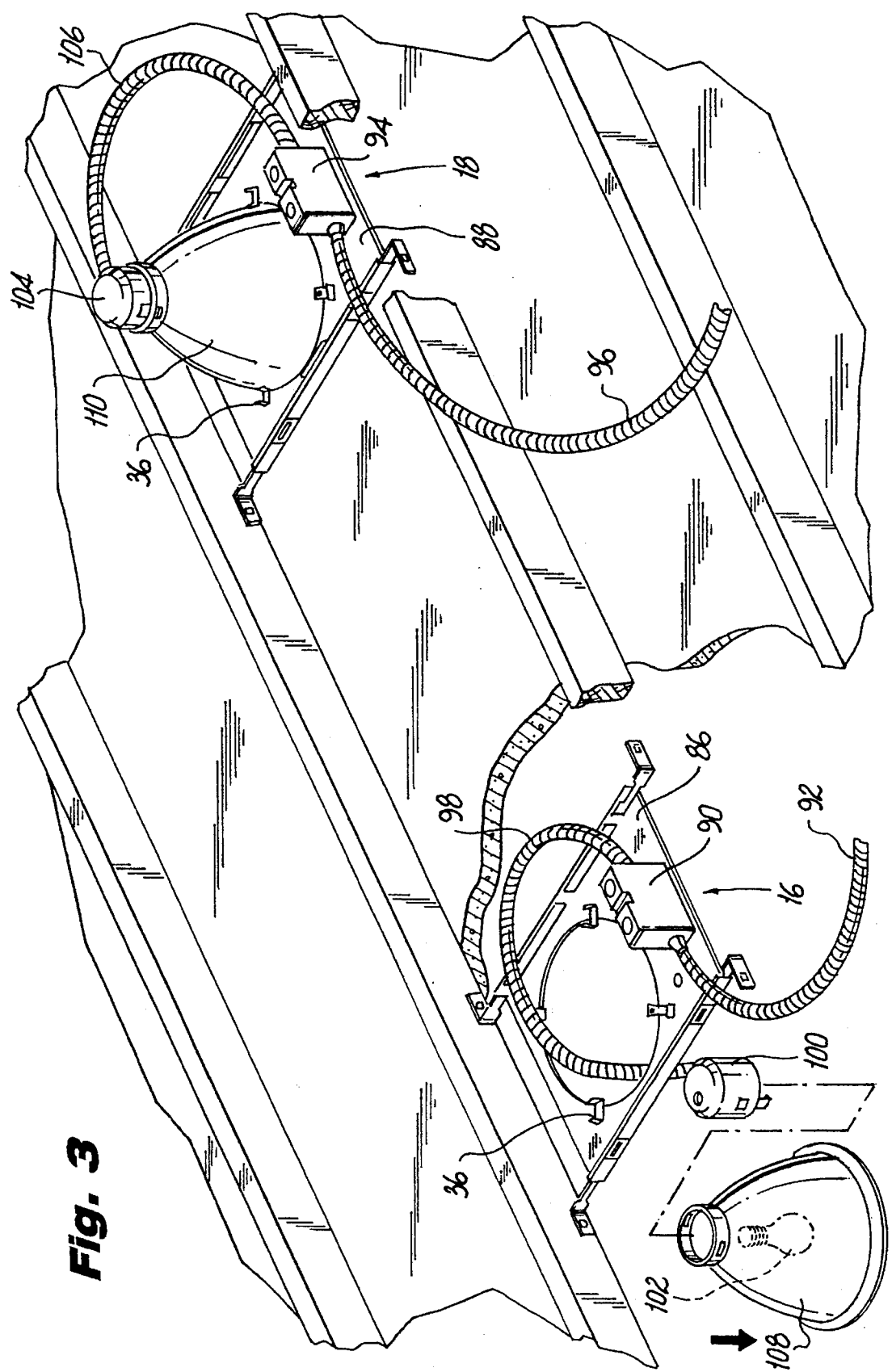
FIG. 3 is a perspective view of two existing ceiling mounted incandescent lighting fixtures prior to having been retrofit for fluorescent service utilizing the assembly of FIG. 1.

Referring now to FIG. 3, the existing ceiling mounted lighting fixtures 16 and 18 include frame structures 86 and 88, respectively. A terminal box 90 is provided on frame 86 which receives power from a remote power source through main cable 92. Similarly, frame 88 has a terminal box 94 which receives power through main cable 96. Transmission cable 98 extends from terminal box 90 to provide power to socket 100. Socket 100 is configured to receive a conventional incandescent light bulb 102. A similar socket 104 is connected to transmission cable 106 which extends from terminal box 94. Sockets 100 and 104 are conventional incandescent sockets and are configured to be mounted to reflector housings 108 and 110. Reflector housings 108 and 110 are dimensioned to be mounted in fixtures 16 and 18 by spring clips 36 which are fastened to frames 86 and 88.

Figure 4:
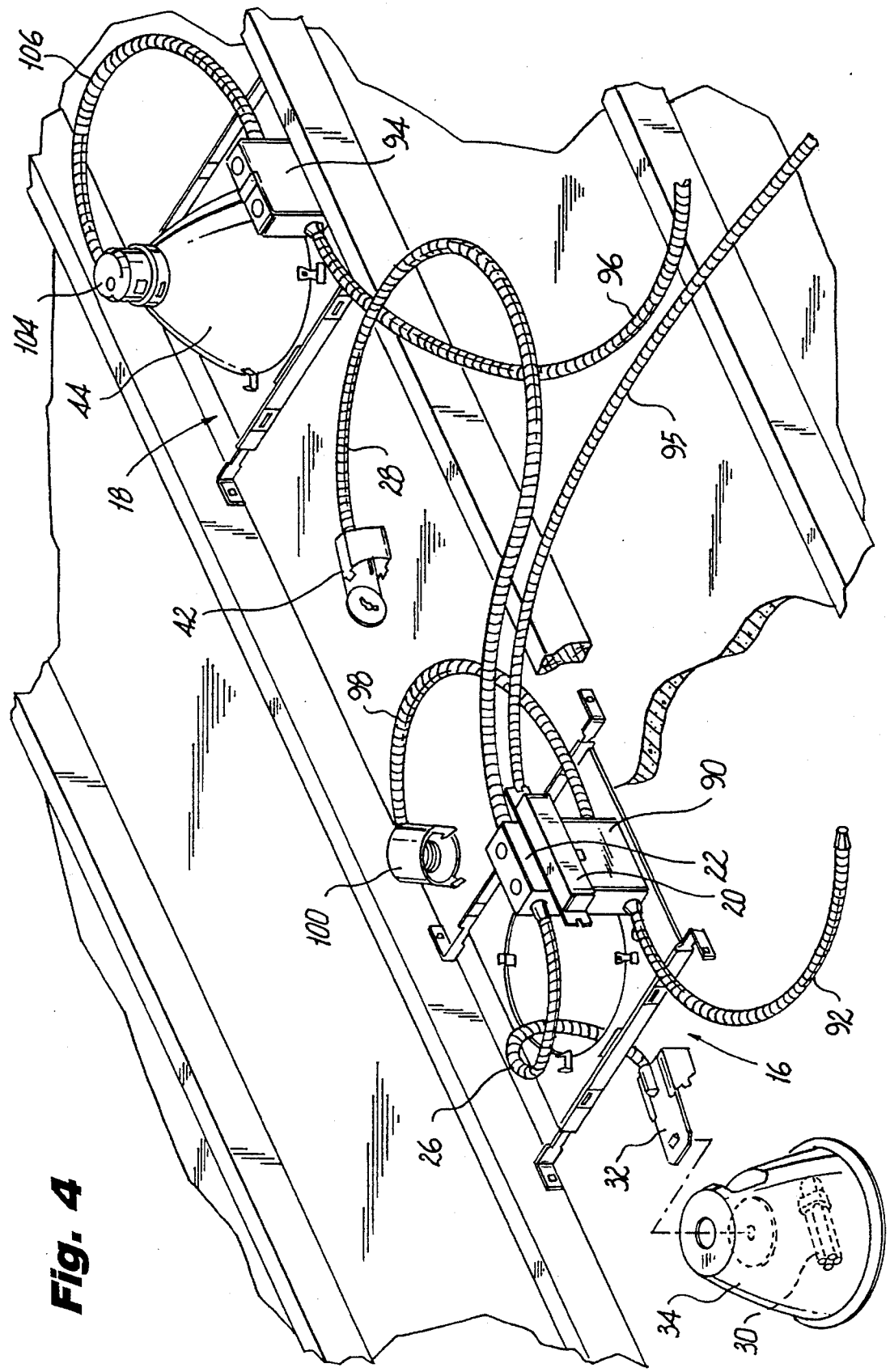
FIG. 4 is a perspective view of the existing lighting fixtures illustrated in FIG. 3 with the retrofit assembly of FIG. 1 partially deployed.

With continued reference to FIG. 3, to retrofit the existing incandescent lighting fixtures 16 and 18 for fluorescent service, the existing incandescent sockets 100 and 104 are detached from reflector housings 108 and 110. Then the existing reflector housings 108 and 110 are removed from lighting fixtures 16 and 18. As shown in FIG. 4, junction box 22 of retrofit assembly 10 is then mounted to the existing terminal box 90 of lighting fixture 16 using standard fasteners. Thereafter, fluorescent lighting units 12 and 14 are connected to fluorescent reflector housings 34 and 44 respectively, and the reflector housings are then mounted in fixtures 16 and 18 utilizing the existing spring clips 36.

Figure 5:
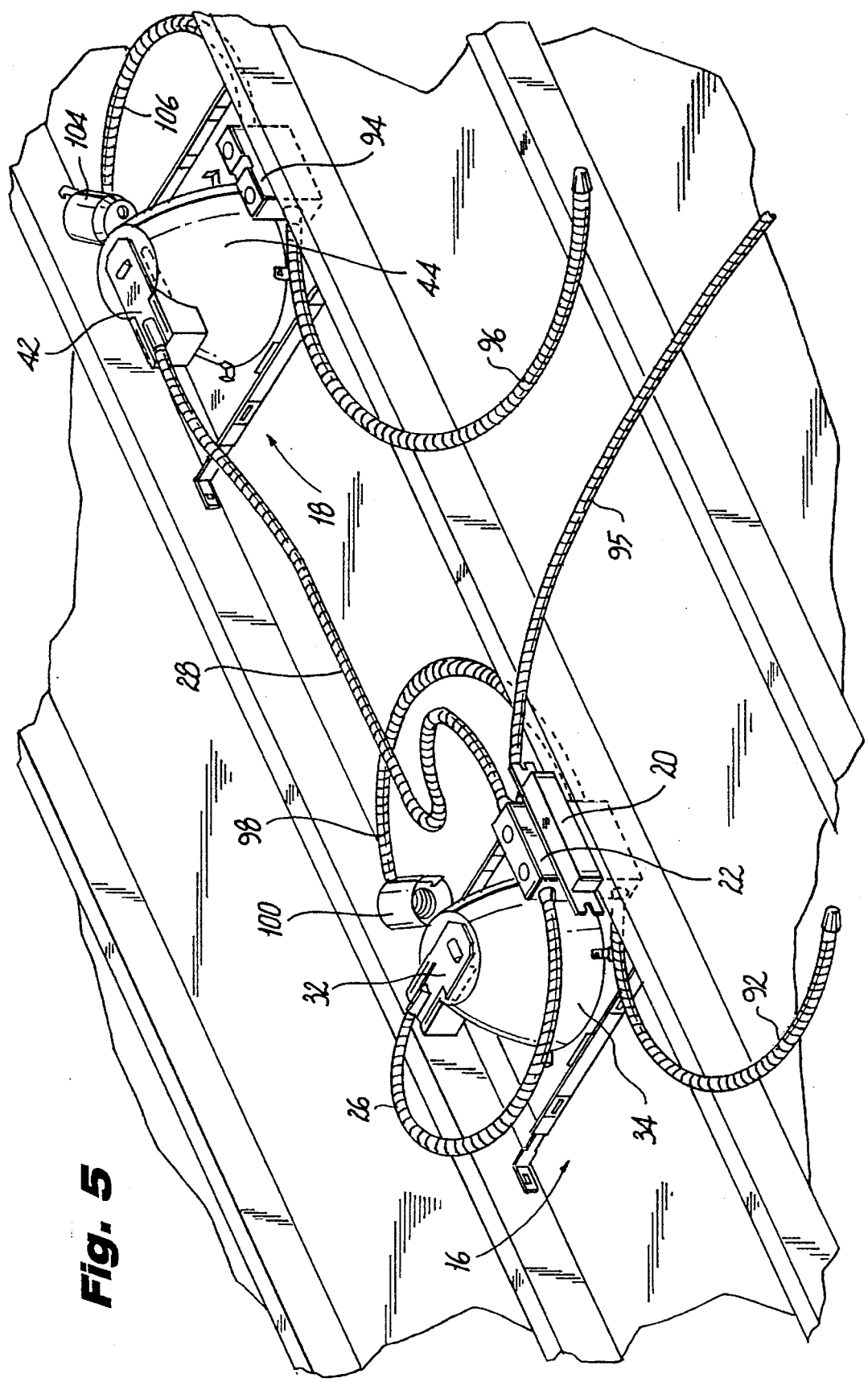
FIG. 5 is a perspective view of the existing incandescent lighting fixtures of FIG. 3 retrofit for fluorescent service utilizing the assembly illustrated in FIG. 1.

Referring to FIG. 5, at the completion of the retrofit procedure, the existing incandescent sockets 100 and 104 may remain in the ceiling adjacent the retrofitted lighting fixtures, or, in the alternative, transmission cables 98 and 106 can be cut and capped to facilitate removal of the incandescent sockets from the ceiling area. The main power cables 92 and 96 which had powered the incandescent lighting units of fixtures 16 and 18 can also be cut and capped, as shown for example in FIG. 5. In such an instance, ballast 20 is provided with a power cable 95 for connection to a remote power supply. Alternatively, as shown in FIG. 2, the existing power cable 92 associated with lighting fixture 16 can be utilized to power ballast 20 by electrically connecting junction box 22 to the existing terminal box 24. In this instance, only power cable 96 would be cut and capped.

It is envisioned that the wattage of the compact lamp units utilized in the retrofit assembly of the subject invention can vary depending upon the needs of the user and the operating conditions of the lighting system. For example, both lighting fixtures can be provided with an 18 watt compact florescent lamp. Alternatively, since socket 58 is configured to receive lamps of different wattage, one fixture can have an 18 watt lamp while the adjacent fixture can contain a 26 watt lamp. Other combinations are also possible and are within the scope of the subject invention.

Although the subject invention has been described with respect to preferred embodiments, it will be readily apparent to those having ordinary skill in the art to which it appertains that changes and modifications may be made thereto without departing from the spirit or scope of the subject invention as defined by the appended claims. For example, those skilled in the art to which the subject invention appertains will readily appreciate that the apparatus and method of the subject invention need not be limited to twin fixture ceiling mounted lighting systems. To the contrary, the subject invention may also be employed in wall mounted and free standing lighting systems, and can include more than two fixtures.

What is claimed is:

1. A method of retrofitting a plurality of adjacent incandescent lighting fixtures for fluorescent service, said method comprising the steps of:
   a) removing an existing incandescent lighting unit from each of a plurality of adjacent lighting fixtures;
   b) mounting a ballast assembly on one of said plurality of adjacent lighting fixtures; and
   c) installing a fluorescent lighting unit, powered by said ballast assembly, in each of said plurality of adjacent lighting fixtures.

2. A method of retrofitting a plurality of lighting fixtures according to claim 1, further comprising the step of connecting said ballast assembly to an existing power supply associated with one of said plurality of adjacent lighting fixtures.

3. A method of retrofitting a plurality of lighting fixtures according to claim 1, further comprising the step of disconnecting each of the existing lighting fixtures from a remote power supply.

4. A method of retrofitting a plurality of lighting fixtures according to claim 1, further comprising the step of replacing an existing reflector housing associated with each of said plurality of adjacent lighting fixtures with a replacement reflector housing adapted for fluorescent illumination.

5. A method of retrofitting two adjacent incandescent lighting fixtures for fluorescent service, said method comprising the steps of:

a) removing an existing incandescent lighting unit from a first lighting fixture;

removing an existing incandescent lighting unit from a second lighting fixture adjacent said first lighting fixture;

c) mounting a ballast assembly on said first lighting fixture;

d) installing a first fluorescent lighting unit, powered by said ballast assembly, in said first lighting fixture; and e) installing a second fluorescent lighting unit, powered by said ballast assembly, in said second lighting fixture.

6. A method of retrofitting a plurality of lighting fixtures according to claim 5, further comprising the step of connecting said ballast assembly to an existing power supply associated with said first lighting fixture.

7. A method of retrofitting a plurality of lighting fixtures according to claim 5, further comprising the step of disconnecting each of the existing lighting fixtures from a remote power supply.

8. A method of retrofitting a plurality of lighting fixtures according to claim 5, further comprising the step of replacing an existing reflector housing associated with each of the first and second lighting fixtures with a replacement reflector housing adapted for fluorescent illumination.

9. Apparatus for retrofitting a plurality of adjacent incandescent lighting fixtures for fluorescent service, which comprises:

a) a ballast assembly configured to be mounted on a first existing lighting fixture;

b) a first fluorescent lighting unit controlled by said ballast assembly and configured to be mounted on said first existing lighting fixture; and c) a second fluorescent lighting unit controlled by said ballast assembly and configured to be mounted on a second existing lighting fixture adjacent said first existing lighting fixture.

10. Apparatus for retrofitting a plurality of lighting fixtures as recited in claim 9, wherein a first cable is provided for connecting said first lighting unit to said ballast assembly and a second cable is provided for connecting said second lighting unit to said ballast assembly, wherein said second cable has a greater length than said first cable.

11. Apparatus for retrofitting a plurality of lighting fixtures as recited in claim 9, wherein said ballast assembly is supported on a junction box configured to be mounted on an existing lighting fixture.

12. Apparatus for retrofitting a plurality of lighting fixtures as recited in claim 9, wherein said first and second fluorescent lighting assemblies each include a lamp housing and a socket supported on the lamp housing for receiving a fluorescent lamp.

13. Apparatus for retrofitting a plurality of lighting fixtures as recited in claim 12, wherein said socket is configured to receive fluorescent lamps of different wattage.

* * * * *